United States Patent [19]

Takanashi et al.

[11] Patent Number: 4,527,171

[45] Date of Patent: Jul. 2, 1985

[54] THERMAL TRANSFER PRINTING EMPLOYING A BINDER

[75] Inventors: Itsuo Takanashi; Hideshi Tanaka; Hisanori Tsumiyama, all of Yokohama; Yoshio Mizuno, Kamakura; Terumi Ohara, Yokohama; Shigeru Kato, Tokyo; Toshinori Takahashi, Kawasaki; Tsutomu Kiuchi, Yokohama, all of Japan

[73] Assignee: Victor Company of Japan, Limited, Yokohama, Japan

[21] Appl. No.: 554,023

[22] Filed: Nov. 21, 1983

[30] Foreign Application Priority Data

Nov. 22, 1982 [JP] Japan ............................... 57-203791

[51] Int. Cl.³ ............................................. G01D 9/00

[52] U.S. Cl. .............................. 346/76 PH; 346/1.1; 101/470

[58] Field of Search ................. 346/1.1, 76 R, 76 PH; 101/470–472, 33, 34; 118/202, 257, 46; 427/261; 156/234; 430/327, 330; 400/191, 202, 120, 206; 219/216, 216 PH

[56] References Cited

U.S. PATENT DOCUMENTS

| | | | |
|---|---|---|---|
| 4,080,897 | 3/1978 | Gundlach | 250/316.1 |
| 4,374,691 | 2/1983 | Van den Bergh | 101/470 |
| 4,415,903 | 11/1983 | Kawanishi et al. | 346/76 PH |

*Primary Examiner*—Thomas H. Tarcza
*Assistant Examiner*—A. Evans
*Attorney, Agent, or Firm*—Pollock, Vande Sande & Priddy

[57] ABSTRACT

In thermal ink transfer printing, a layer of thermally fusable binder is deposited on a recording sheet prior to the transfer print of thermally fusable ink from a transfer sheet to provide a strong bond between the underlying recording sheet and the overlying ink deposits. In one embodiment, layers of thermally fusable ink and binder material are deposited on the base of a common transfer sheet in alternate fashion. The binder layer is initially positioned above a thermal head and the latter is heated so that the binder is fused and transferred to the recording sheet. The recording sheet and transfer sheet are advanced together with respect to the head so that the recording sheet is entirely covered with a layer of the binder material. Thereafter, the binder-coated recording sheet comes into contact with the ink layer and the thermal head is controlled to heat portions of the ink layer for transfer to the binder-coated surface of the recording sheet.

11 Claims, 7 Drawing Figures

THERMAL TRANSFER PRINTING EMPLOYING A BINDER

BACKGROUND OF THE INVENTION

The present invention relates to a thermal ink transfer printer.

Thermal printing employing a thermal ink transfer sheet is known in the art. In this type of printing, the transfer sheet is laminated with a recording sheet of paper and heated by a thermal head so that portions of ink are fused and transferred from the transfer sheet to the recording sheet. A shortcoming inherent in this type of printing resides in the fact that since the ink has no strong bond to paper, small dots of transferred ink tend to be easily displaced from the recording sheet. The disadvantage is particularly severe in the case of printing color images where layers of different color ink are printed one upon another since the upper layers tend to be more easily displaced than is the lowermost layer.

SUMMARY OF THE INVENTION

The invention contemplates to apply a coating of a binder material to the surface of a recording sheet prior to thermal printing operation.

According to the invention, there is provided a method for printing an image on a recording sheet in response to a video signal. The method comprises the steps of feeding a thermal ink transfer sheet with the recording sheet, the thermal ink transfer sheet having a base and a layer of thermally fusable ink deposited thereon, and simultaneously therewith heating successive portions of the ink transfer sheet in response to the video signal to fuse the portions of ink and transferring the fused ink portions from the base to the recording sheet. The invention is characterized by the step of applying a coating of a binder on the recording sheet prior to the step of heating the ink transfer sheet by heating successive portions of a layer of a thermally fusable binding material deposited on a base, fusing the portions of binding material and transferring the fused binding portions from the last-mentioned base to the recording sheet to allow the fused ink portions to be deposited on the coating.

In a preferred embodiment, a layer of thermally fusable binding material is deposited on a common transfer sheet on which a layer of thermally fusable ink is also deposited. The binding layer is positioned above the thermal head and the latter is first heated so that the binding material is fused and transferred to the recording sheet. The platen is rotated so that the start line of the recording sheet comes into alignment both with the start line of the ink layer and the thermal head. The latter is controlled so that it heats portions of the ink layer to effect the transfer of the heated portions to the binder-coated surface of the recording sheet.

BRIEF DESCRIPTION OF THE DRAWINGS

The present invention will be described in further detail with reference to the accompanying drawings, in which.

DETAILED DESCRIPTION

Figure 1:
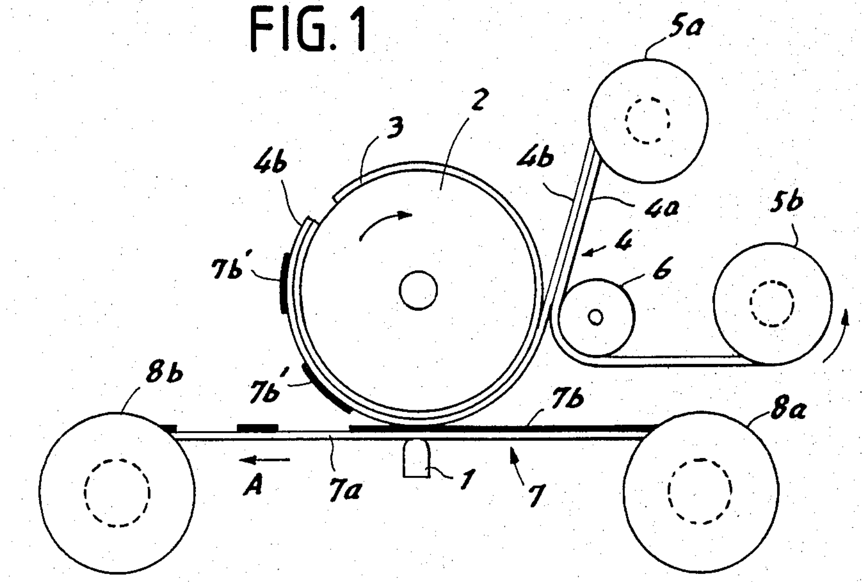
FIG. 1 is an illustration of a printing apparatus according to a first embodiment of the invention.

Referring to FIG. 1, there is shown a thermal ink transfer printer according to an embodiment of the invention. The printer comprises a thermal head 1 located below a platen 2 on which is wound a recording sheet of paper 3. The platen 2 is driven by a motor, not shown, in a clockwise direction and a thermal-ink transfer sheet 7 is transported in a direction indicated by the arrow A from a supply reel 8*a* to a takeup reel 8*b*.

According to the invention, a binder applying device is provided which includes a supply reel 5*a* which supplies a thermal binder transfer sheet 4 to a takeup reel 5*b* which is driven by a motor, not shown. This binder sheet comprises a polyester base 4*a* having a thickness of 6 micrometers and a transparent layer of thermally fusable binder 4*b* deposited on the base 4*a* to a thickness of 6 micrometers. A suitable material for the thermally fusable binder 4*b* is a compound comprising 45 weight percent of carnauba wax and 55 weight percent of lubricating oil (copolymer such as polyvinyl acetate, polystylene and stylene-butadiyne). Such a binder material has a melting point of 60 degrees centigrade.

A thermal roller 6 is located between the reels 5*a* and 5*b* and is movable from a nonworking position to a working position in which it presses the binder sheet 4 into contact with the recording sheet 3 as illustrated. The thermal roller 6 is coated by a nonsticking material such as Teflon (trademark) and includes a resistance heater element which heats the surface of the roller 6 to allow the binding material 4*b* to fuse. The fused binder detaches from the base 4*a* and sticks to the recording sheet 3.

The thermal-ink transfer sheet 7 comprises a polyester base *7a*, 6 micrometers thick and a layer of thermally fusable ink *7b* deposited on the base *7a* to a thickness of 3 micrometers. The fusable ink is a compound which comprises typically 25 weight percent of carnauba wax, 50 weight percent of pigment and 25 weight percent of lubricating oil of the kind mentioned above. The ink is fusable at a temperature of 70 degrees centigrade.

The ink transfer sheet 7 is brought into contact with the surface of the binder 4*b* which has been applied to the recording sheet 3 when the thermal head 1 moves into contact with the ink transfer sheet 7. The thermal head 1 extends across the width of the ink transfer sheet and includes an array of resistance elements. These resistance elements are heated by currents supplied from a control circuit which will be described later.

The heated portions of the ink transfer sheet 7 are fused and detach from the base *7a* and stick to the binder-coated recording sheet as shown at *7b'*. The binder 4*b* provides a strong bond between the underlying sheet 3 and the overlying ink deposits *7b'*.

Preferably, the surface of the ink deposits *7b'* is covered with an additional binder layer to prevent them from detaching from the underlying binder layer 4b. This is accomplished by further rotating the platen 2 while continuing the operation of the binder applying device after the printing is completed.

Figure 2:
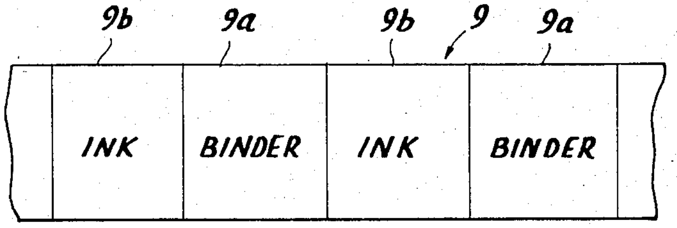
FIG. 2 is an illustration of a portion of a transfer sheet on which layers of ink and binder are arranged in alternate fashion.

In a modified embodiment, a transfer sheet as shown in FIG. 2 is employed instead of the binder applying device of FIG. 1. A transfer sheet 9 comprises a plurality of thermally fusable binder layers 9a and thermally fusable ink layers 9b which are deposited on the polyester base alternately along the length of the sheet. The transfer sheet 9 is supported on the supply and takeup reels 8a and 8b in an arrangement shown in FIG. 5.

The binder layer 9a is first positioned so that its start line is located above the thermal head 1 and aligned with the start line of the recording sheet 3. All the heating elements of the thermal head 1 are heated while the platen 2 rotates a first full turn to transfer the binder layer 9a to the recording sheet 3 wound on the platen 2. The start line of the ink layer 9b is again positioned on the thermal head 1 and the latter is activated in response to control signals to effect the transfer of ink to the binder-coated surface as shown in FIG. 5a.

Alternatively, a thermal roller may be provided to transfer the binder layer 9a. This thermal roller is heated and brought into contact with the recording sheet while the platen 2 turns a first full revolution and then moved to a retracted position to allow the thermal head 1 to be moved to the print position.

Figure 3:
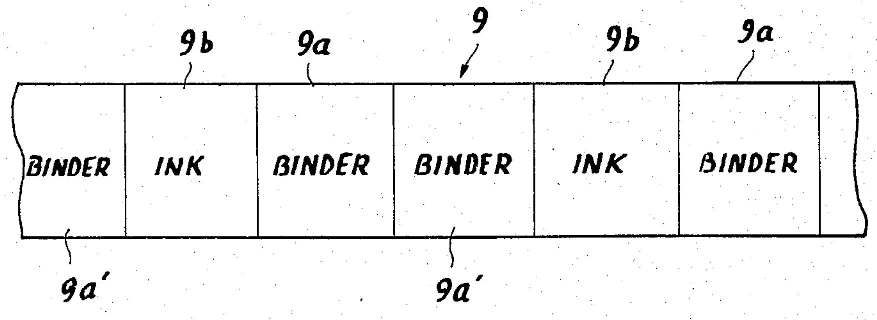
FIG. 3 is an illustration of a portion of a modified form of the transfer sheet of FIG. 2.

A transfer sheet shown in FIG. 3 is to provide a binder coat on the printed surface. Such coatings serve to prevent the ink deposits from detaching from the underlying binder layer. This transfer sheet differs from the sheet of FIG. 2 in that it includes an additional binder layer 9a' between an ink layer 9b which is used to print an image on a given sheet 3 and a binder layer 9a which is used to coat the next sheet. The additional binder layer 9a' is transferred to the printed surface of the given sheet by heating all the resistance elements of the head 1 at the end of the print operation.

Figure 4:
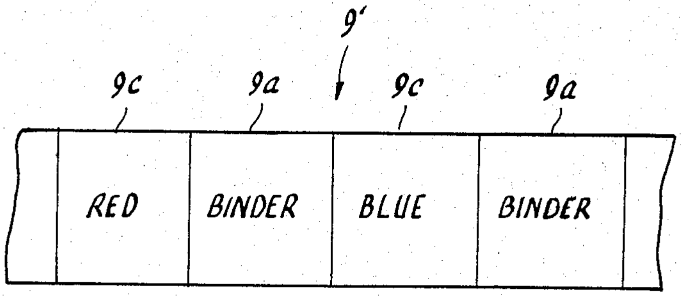
FIG. 4 is an illustration of a portion of a transfer sheet for color printing.

FIG. 4 is an illustration of a further embodiment of the transfer sheet which is used for providing a color print. The transfer sheet 9' includes a plurality of color ink layers 9c and a plurality of binder layers 9a each of which is arranged between different ones of the color ink layers so that a binder coat may be provided between the recording sheet 3 and a layer of given color deposits and between layers of different color deposits.

Figure 6:
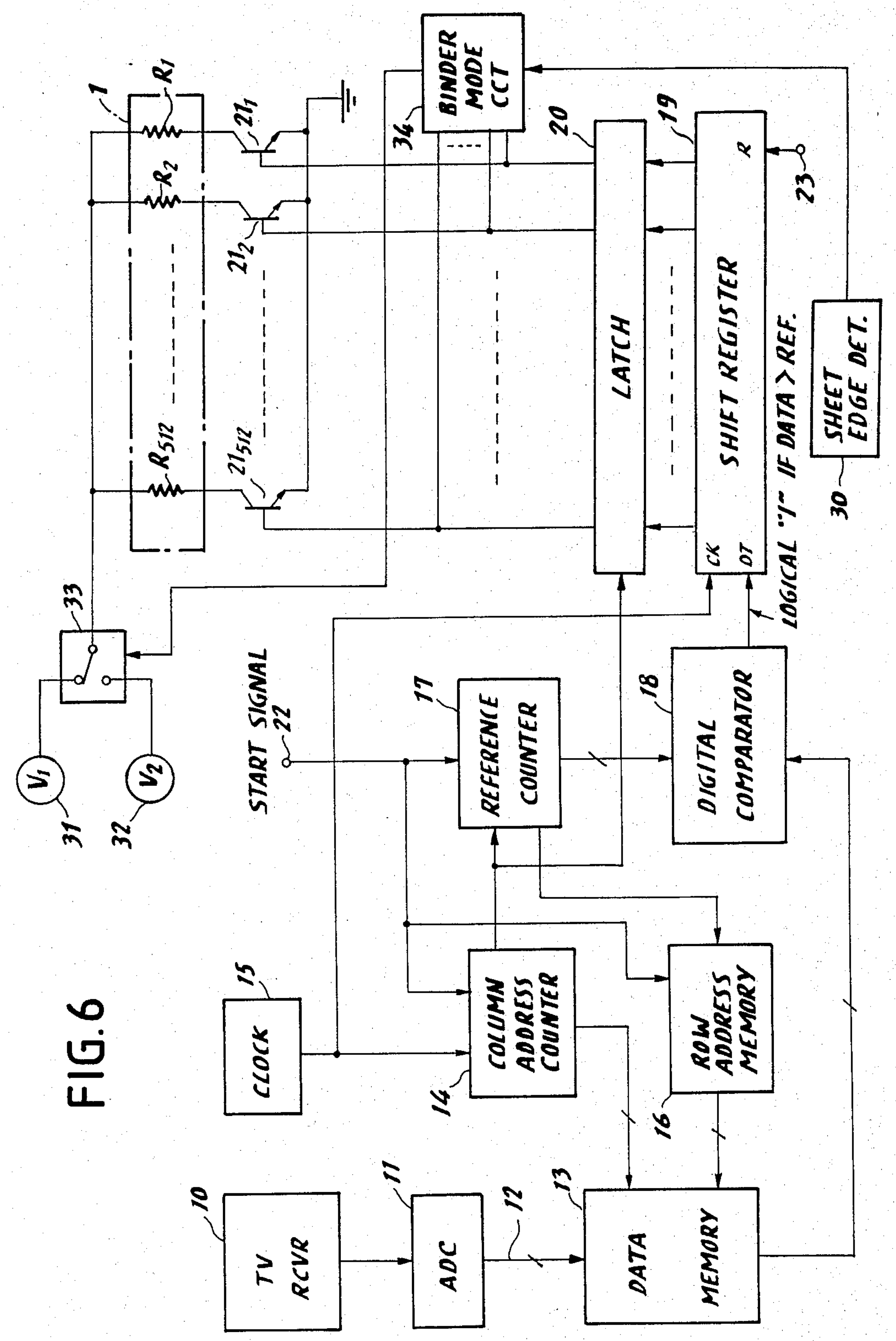
FIG. 6 is a block diagram of a typical example of the control circuit for controlling the thermal head of FIG. 5.

FIG. 6 is an illustration of a circuit arrangement for controlling the thermal head 1. For purposes of illustration, the thermal head 1 is provided with a linear array of 512 rectangular shaped resistance elements $R_1$ through $R_{512}$. First terminals of these resistance elements are coupled together to a lower voltage source 31 or a higher voltage source 32 through a changeover switch 33 and their second terminals are coupled respectively to the collectors of transistors 21$_1$ to 21$_{512}$ whose emitters are connected to ground. The sheet edge detector 30 is located adjacent to the platen 2 to detect the start line of the recording sheet 3. A binder mode circuit 34 receives an output signal from the edge detector 30 to apply a binary 1 to all the bases of the transistors 21$_1$ through 21$_{512}$ for coupling all the second terminals of resistance elements to ground. At the same time the circuit 34 provides a switching signal to the switch 33 to connect the lower voltage source 31 to the first terminals of the resistance elements. All the resistance elements are thus heated to a temperature sufficient to fuse the binder, which is 60° C. as noted above.

Figure 5:
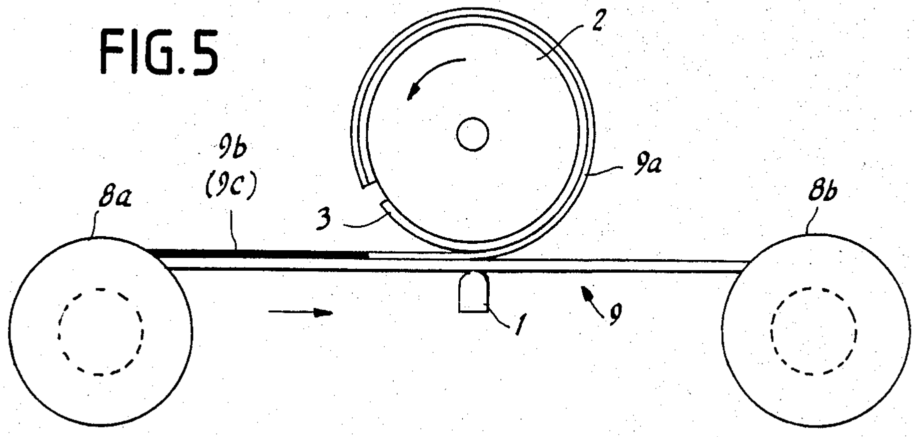
FIG. 5 is an illustration of a printing apparatus of a second embodiment employing the transfer sheets of FIGS. 2, 3 and 4.
Figure 5A:
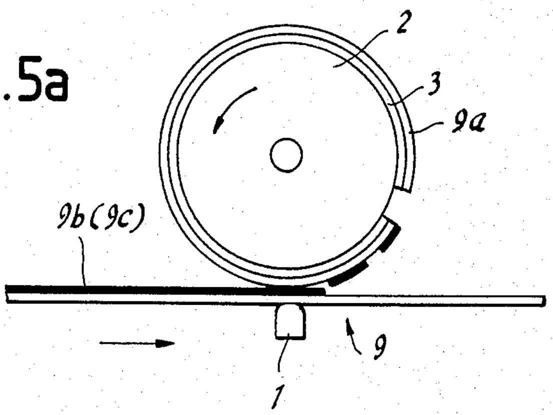
FIG. 5*a* is an illustration of the printing operation of the apparatus of FIG. 5.

With the start line of a binder layer 9a being located above the thermal head 1, the rotation of the platen 2, FIG. 5, causes the binder layer 9a to be fused and transferred to the recording sheet 3. When the binder layer 9a has been transferred to the sheet 3, the sheet edge detector 30 issues a signal to cause the binder mode circuit 34 to remove the binary 1's from the bases of transistors 21 and the switching signal from the switch 33 so that the higher voltage source 32 is coupled to the resistance elements. The apparatus is now ready to operate in a print mode in which the resistance elements are heated to a temperature sufficient to fuse the ink layer.

A signal source 10, which may be a television receiver or a video tape recorder or the like, supplies an analog television signal to an analog-digital converter 11 where the signal is sampled in response to clock pulses from source 15 and converted to a digital video sample of 6-bit data word, which is applied on parallel bit lines 12 to a data memory 13. The data memory 13 comprises a random access memory having a matrix of cell locations arranged in a pattern of 512 rows by 512 columns. The digital samples of each television line scan are sequentially written into the memory 13 in the direction of rows to store a complete picture frame.

After the complete picture frame has been stored in the memory 13, 512 digital samples are sequentially read from each row in response to a 9-bit address word generated by a 9-bit column address counter 14 in response to the clock pulse. As will be described, the digital samples of each row are repeatedly read out 64 times for comparison with a digital reference value to determine the tone value of the original picture element and thereupon the reading operation is shifted to the next row in response to a 9-bit row address code supplied from a 9-bit row address counter 16.

When 512 clock pulses have been counted the column address counter 24 supplies a carry or "full count" signal to a 6-bit reference counter 17 to increment its count from the initial value "000000" to the maximum of "111111" in response to each readout of 512 video samples. This reference counter can be considered as a digital sawtooth generator since its output stepwisely follows the waveform of a sawtooth. This time-varying 6-bit digital reference is supplied to a digital comparator 18 for comparison with the 6-bit data word read out of memory 13. The comparator 18 generates a logical one output if the digital sample has a tone value greater than the reference value and generates a logical zero output if the tone value is equal to or smaller than the reference value. When the maximum reference value "111111" is reached, the reference counter 17 applies a full-count signal to the row address counter 16 to shift the readout operation to the next row. The logical ones and zeros from the comparator 18 are clocked into the data input terminal of a shift register 19 having 512 bit positions.

It will be appreciated therefore that the shift register 19 is loaded with a random sequence of 512 binary l's and 0's depending on the relative values of the data words retrieved from the 512 cell locations of a given row to an instantaneous value of the digital reference. The binary data stored in the shift register 19 are transferred through a latch 20 to the bases of transistors 21$_1$ through 21$_{512}$, respectively, in response to the carry signal from the column address counter 14 which is also supplied to the reference counter 17. The transistors 21 have their emitters coupled to ground and their collectors coupled to resistance elements $R_1$ to $R_{512}$ respectively. Those transistors which are supplied with binary 1's from the latch 20 are gated into conduction to generate currents in the associated resistance elements.

The reading operation begins with the application of a start signal applied to terminals 22 and 23 which may be derived from the binder mode circuit 34. This start signal resets the counters 14, 17 and shift register 19 to clear any stored contents. The column address counter 14 is incremented by the clock source 15 to address the data memory 13 to read out a series of 512 digital samples in succession out of the No. 1 row into the digital comparator 18. The same digital samples are read out 64 times in response to the clock pulse. In synchronism with these reading operations the reference counter 17 is incremented from the minimum value to the maximum value. The output of the digital comparator 18 is 64 series of 512 binary 1's and 0's, with each series being applied to the thermal head 1 in response to each count of 512 clock pulses. The ink layer 5 is fused in positions corresponding to the heated resistance elements, the fused portions of ink being transferred to the recording sheet 3 as described above. More specifically, a series of rectangles is produced in a direction perpendicular to the direction of advancement of sheet 3 for each of 64 iterative reading operations. With a continued advancement of recording sheet 3 and transfer sheet 4, 64 series of rectangles.

The length of each rectangle as measured in the longitudinal direction of the paper 3 varies depending on the density of the original picture element.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for printing an image on a recording sheet positioned on a platen, in response to a video signal, comprising the steps of:
   - feeding a first transfer sheet having a layer of thermally fusable binder material thereon to contact the recording sheet;
   - heating the transfer sheet for fusing the binder material to the recording sheet and transferring a coating of binder material to the recording sheet;
   - feeding a second transfer sheet having a layer of thermally fusable ink thereon to contact the transferred binding material coating;
   - heating the second transfer sheet thereby fusing the ink to the coating and transferring the ink from the second transfer sheet to said coating.

2. A method for printing an image on a recording sheet positioned on a platen, responsive to a video signal comprising the steps of:
   - feeding a transfer sheet to contact the recording sheet, said transfer sheet having a base common to linearly successive and thermally fusable ink and binder layers deposited on the base;
   - heating each binder layer causing binder material to fuse to the recording sheet and transferring a coating of fused binder material from the transfer sheet onto said recording sheet;
   - heating said thermally fusable ink layers after each transfer of the binder material coating to the recording sheet thereby fusing the ink to the coating and transferring fused ink from the transfer sheet onto said binder coating.

3. A method as claimed in claim 2, further comprising the step of coating said recording sheet with an additional coating of said binding material after said ink is deposited on the first-mentioned coating.

4. A method as claimed in claim 1, wherein said thermally fusable binding material is fused at a temperature lower than the temperature at which said thermally fusable ink is fused.

5. A method as claimed in claim 2, wherein said thermally fusable binding material is fused at a temperature lower than the temperature at which said thermally fusable ink is fused.

6. A method as claimed in claim 1, further comprising by the step of coating said recording sheet with an additional coating of said binding material after said ink is deposited on the first-mentioned coating.

7. A method as claimed in claim 2, wherein said layer of thermally fusable binding material is twice as long as the layer of thermally fusable ink in a longitudinal direction of said common transfer sheet.

8. A method for operating a thermal printer having a rotatable platen on which a recording sheet is wound, a thermal head, means for transporting a thermal ink transfer sheet in contact with said recording sheet and said thermal head, said ink transfer sheet having a layer of thermally fusable ink deposited on a base, and control means for heating said thermal head in response to a video signal to fuse portions of the ink layer and transfer the fused portions to said recording sheet, the method comprising the step of applying a coating of a binding material to said recording sheet while rotating said platen followed by the step of transporting said ink transfer sheet to contact said recording sheet while causing said control means to effect the transfer of ink portions to said coating applied to said recording sheet.

9. A thermal printing apparatus comprising:
   - a motor-driven platen on which a recording sheet is wound;
   - a thermal head having an array of resistance elements;
   - means for transporting a thermal ink transfer sheet in contact with said recording sheet and said thermal head, said thermal ink transfer sheet including a layer of thermally fusable ink deposited on a base;
   - control means for heating said resistance elements in response to said video signal to transfer portions of said ink which are heated by said resistance elements to said recording sheet while said platen is rotated to transport said recording sheet; and
   - means for applying a layer of a binder material to said recording sheet while said platen is rotated to transport said recording sheet, prior to the transfer of said ink portions to said recording sheet.

10. A thermal printing apparatus as claimed in claim 9, wherein said binder applying means comprises a thermally heated roller and means for transporting a thermal binder transfer sheet in contact with said heated roller, said thermal binder transfer sheet including a base and a layer of thermally fusable binder material deposited thereon, said heated roller acting to fuse said binder material and causing it to be transferred to said recording sheet.

11. A thermal printing apparatus comprising:
   - a motor-driven platen on which a recording sheet is wound;

a thermal head having an array of resistance elements;

means for transporting a transfer sheet in contact with said recording sheet and said thermal head, said transfer sheet including at least one segment layered with thermally fusable ink and at least one segment layered with thermally fusable binder material which are deposited on a base; and control means for heating all of said resistance elements when said segments layered with binder material are in contact with said thermal head to transfer said binder material to said recording sheet and heating said resistance element, when said segments layered with ink are in contact with said thermal head in response to said video signal to transfer portions of said ink which are heated by said resistance elements to said binding material coated recording sheet.

* * * * *